(12) United States Patent
Dei Castelli

(10) Patent No.: US 11,312,351 B2
(45) Date of Patent: Apr. 26, 2022

(54) NOZZLES AND CONTROL SYSTEMS FOR HOVERCRAFTS

(71) Applicant: Alberto Dei Castelli, São José dos Campos (BR)

(72) Inventor: Alberto Dei Castelli, São José dos Campos (BR)

(*) Notice: Subject to any disclaimer, the term of this patent is extended or adjusted under 35 U.S.C. 154(b) by 98 days.

(21) Appl. No.: 16/761,906

(22) PCT Filed: Nov. 6, 2017

(86) PCT No.: PCT/BR2017/050334
§ 371 (c)(1),
(2) Date: May 6, 2020

(87) PCT Pub. No.: WO2019/084639
PCT Pub. Date: May 9, 2019

(65) Prior Publication Data
US 2020/0298815 A1    Sep. 24, 2020

(51) Int. Cl.
*B60V 1/04* (2006.01)
*B60V 1/11* (2006.01)
*B60V 1/15* (2006.01)
*B60V 1/16* (2006.01)

(52) U.S. Cl.
CPC ............. *B60V 1/043* (2013.01); *B60V 1/11* (2013.01); *B60V 1/15* (2013.01); *B60V 1/16* (2013.01)

(58) Field of Classification Search
CPC .. B60V 1/043; B60V 1/11; B60V 1/15; B60V 1/16
See application file for complete search history.

(56) References Cited

U.S. PATENT DOCUMENTS

| | | | | |
|---|---|---|---|---|
| 3,208,543 A | * | 9/1965 | Crowley | B60V 1/046 180/121 |
| 3,262,510 A | * | 7/1966 | Froehler | B60V 1/02 180/122 |
| 3,342,278 A | * | 9/1967 | Cocksedge | B60V 1/043 180/117 |
| 3,548,969 A | * | 12/1970 | Paull | B60V 1/02 180/130 |
| 5,370,197 A | | 12/1994 | Goodwin et al. | |
| 9,714,020 B1 | * | 7/2017 | Bennett, Jr. | B60V 1/18 |

* cited by examiner

*Primary Examiner* — Kevin Hurley
(74) *Attorney, Agent, or Firm* — Sanchelima & Associates, P.A.; Christian Sanchelima; Jesus Sanchelima

(57) ABSTRACT

A hovercraft including imaginary longitudinal, transverse and vertical axes; a propulsion system (12), configured to generate airflow; a base (50) and, a skirt (13) wherein the skirt (13) further including air permeable regions (130) and at least two set of outflow nozzles (220); wherein the air permeable regions (130) and the set of outflow nozzles (20, 21) are in fluid communication; wherein each set of nozzles (20, 21) comprises, at least, one outflow nozzle (22), said outflow nozzle (22) including two opposing ends, a first end (221) and a second end (222); the hovercraft further including actuating means (30) suitable to control the opening of at least one end (221 or 222) of the nozzles (22) managing the passage of airflow through the end (221 or 222). The technical features and functionalities described herein are applicable to the field of hovercrafts. More particularly, to controllable outflow nozzles and controlling systems for hovercrafts.

7 Claims, 8 Drawing Sheets

NOZZLES AND CONTROL SYSTEMS FOR HOVERCRAFTS

TECHNICAL SECTOR

The technical features and functionalities described herein are applicable to the field of hovercrafts. More particularly, to controllable outflow nozzles and controlling systems for hovercrafts.

DESCRIPTION OF THE STATE-OF-THE ART

Presently, most hovercrafts found in the market do include "skirts", so-called skirts were introduced on hovercrafts in order to enhance the air-cushion and increase the gap between the bottom of the hovercraft and the ground (land or water), they consist typically on fixed walls, extending in a vertical direction from the lateral limits of the hovercrafts.

Typically, hovercrafts include one or more propulsion units capable of generating the necessary amount of airflow to promote the air cushion and thrust, to lift the hovercraft from ground and to displace it, respectively. Hovercrafts rely on airflow deviating means to define the ratio between the amount of airflow to promote the air cushion and the thrust.

The North American U.S. Pat. No. 5,370,197, issued to Goodwin et al., describes a hovercraft configuration including a so-called plenum chamber being in fluid communication to a deflector, the deflector deviating part of the airflow to the plenum chamber. Typically, deviating means causes some inefficiency in hovercrafts, by increasing the hovercraft in complexity and weight, and by causing pressure loses to the airflow.

Another drawback found on hovercrafts is a reduced tolerance to side impacts of the controlling means; besides the flexibility of the skirts, some hovercraft include rigid airflow deflector or outflow nozzles, that are likely to break in case of impact.

There is a need for a hovercraft configured to provide a more efficient way to promote the air cushion and thrust.

There is also a need for a hovercraft having control means that tolerate impacts and continuing to operate after being heat.

There is still a need for a hovercraft configured to provide a more efficient way to promote the air cushion and thrust, and having control means that tolerate impacts and continuing to operate after being heat.

BRIEF DESCRIPTION OF THE INVENTION

The present invention describes controllable outflow nozzles for hovercrafts. The controllable outflow nozzles being arranged on air permeable regions of the skirt of the hovercraft.

Yet, in another aspect of the present invention, a controlling system for the hovercraft is described. The controlling system including means for controlling the set of outflow nozzles placed on the air permeable regions of the skirt.

OBJECTIVES OF THE PRESENT INVENTION

It is an object of the present invention to provide a skirt for hovercrafts; the skirt including air permeable regions and controllable nozzles for controlling its flight, such nozzles being capable of tolerating impacts during their operation.

Yet another objective of the present invention is providing a control system for hovercrafts, the control system comprising a skirt including air permeable regions and controllable nozzles for controlling its flight. The control system providing an efficient use of the airflow originated by the propulsion system.

Still another objective of the present invention is a hovercraft configured to provide a more efficient way to promote the air cushion and thrust, and having control means that tolerate impacts and continuing to operate after being heat By a nozzle that "tolerates impacts" it is to be understood as an outflow nozzle that can be deformed under an external force and re assume its original and active configuration once the external force is removed.

By "efficient use of the airflow originated by the propellers" it is to be understood as using a minimal amount of the total airflow generated by the propellers, allowing as much the remaining airflow for maintaining the air-cushion.

By "hover gap" it's understood the vertical distance between the ground and the bottom of the hovercraft.

DETAILED DESCRIPTION OF THE INVENTION

The present invention consists on including nozzles and air permeable regions onto the skirts of the hovercrafts, wherein the nozzles and the air permeable regions are in fluid communication. Such nozzles being constructed to allow part of the air cushion flow to pass throughout the skirt and, to controlling the direction and amount of air outflow leaving such nozzles. As a result, the controlled outflow leaving the nozzles can be managed in order to control the displacement of the hovercraft during flight. The referred nozzles can be controlled to deflect the airflow when passing throughout the air permeable regions of the skirt. Accordingly, the outflow doesn't simply pass throughout the air permeable regions of the skirt, but are deflected to the front or the rear part of the hovercraft, while passing by those regions.

The present nozzles are preferentially constructed in flexible materials, besides not mandatory to controlling the hovercraft. When constructed in flexible materials, the nozzles will tolerate mechanical shocks, which is likely to occur since they are placed on the skirts of the hovercrafts; the most external region of the hovercraft. The mechanical shocks may occur, in different potential situations, as for example; when one hovercraft collide to another one, in a recreational play.

Accordingly to FIGS. 1 to 5, there are depicted non-limiting examples of different nozzles conditions and corresponding resulting forces and movements. As by FIG. 1 the hovercraft is configured to thrust ahead, by FIG. 2 it is configured to thrust back, by FIG. 3 it is configured to turn left, by FIG. 4 it is configured to turn right, and by FIG. 5 configured to rotate clockwise, purely.

A control system including those nozzles, comprises a skirt including air permeable regions and nozzles that are connected to actuating means. In this sense, both the nozzles and the actuating means are to be constructed in a manner to resulting in a lightweight mechanism, which is desired like any other system or element included in hovercrafts.

From the foregoing description, one skilled in the art can ascertain the essential characteristics of this invention, and without departing from the spirit and scope thereof, can make various changes and modifications. The embodiments set forth by way of illustration or example are not intended as limitations on the variations possible in practicing the present invention.

EXAMPLE

Figure 1:
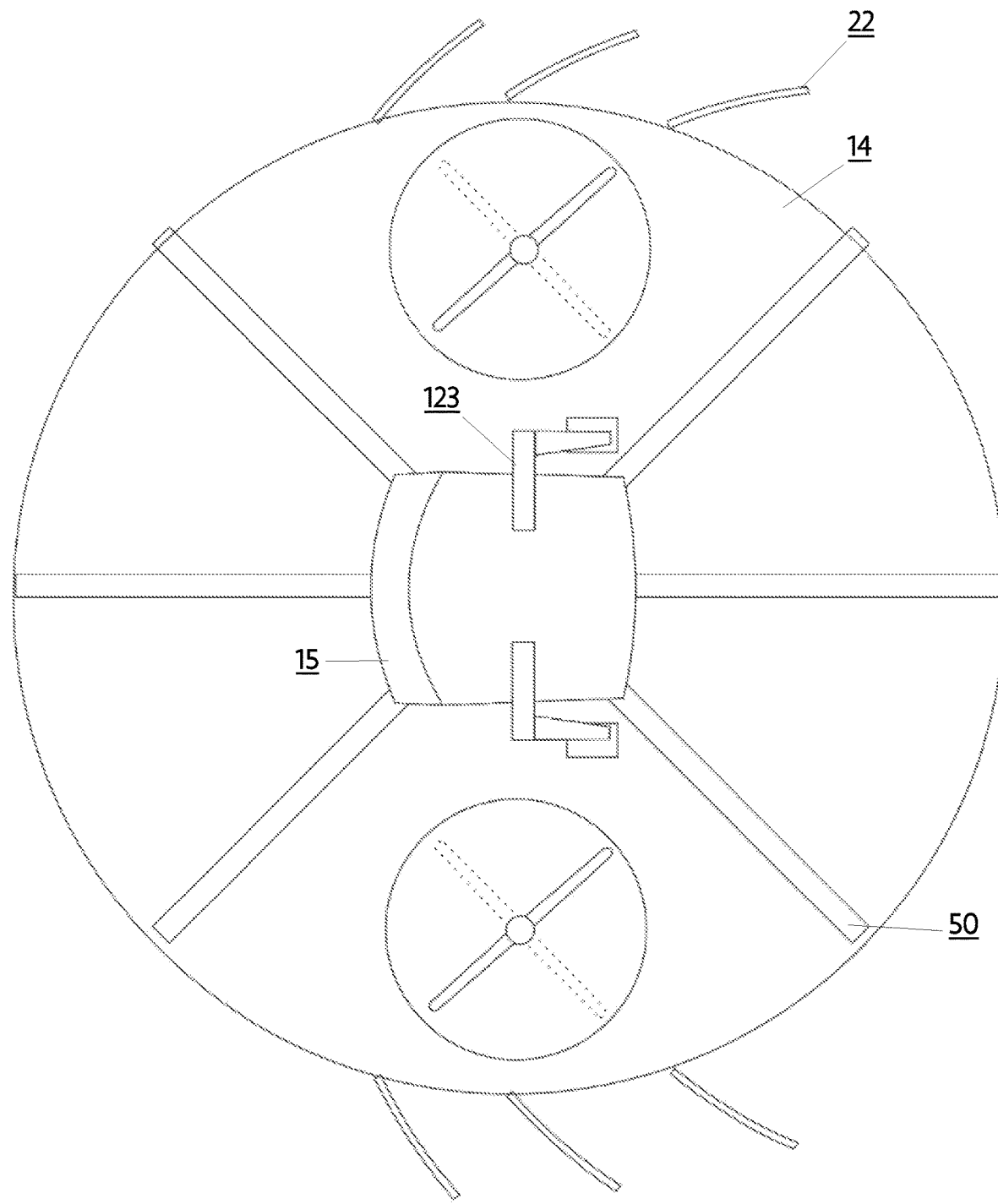
FIGS. 1 to 5: Illustrates a set of figures depicting different nozzles conditions like front acceleration, turning right-left, front deceleration; and, pure rotation.
Figure 2:
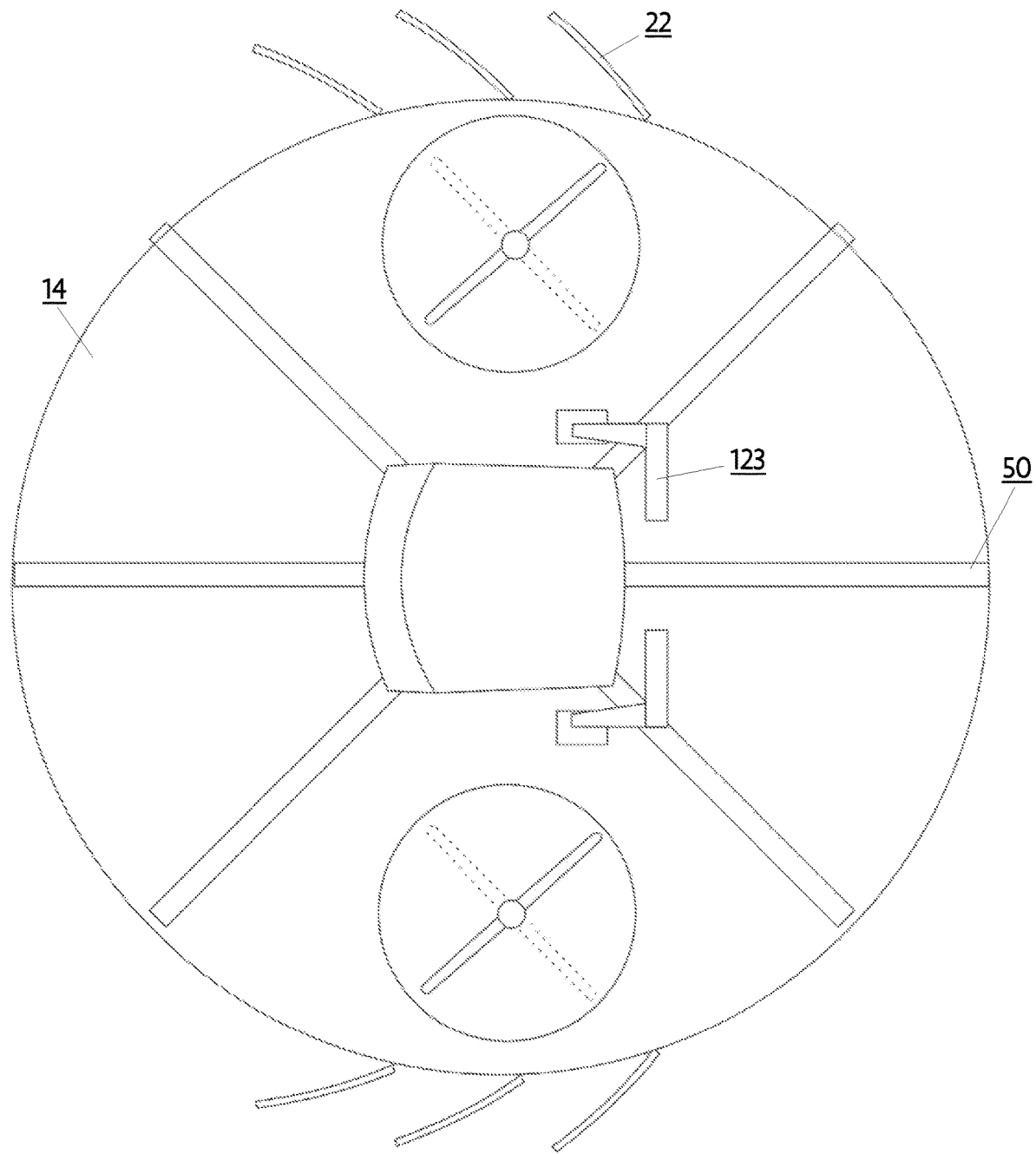
Figure 3:
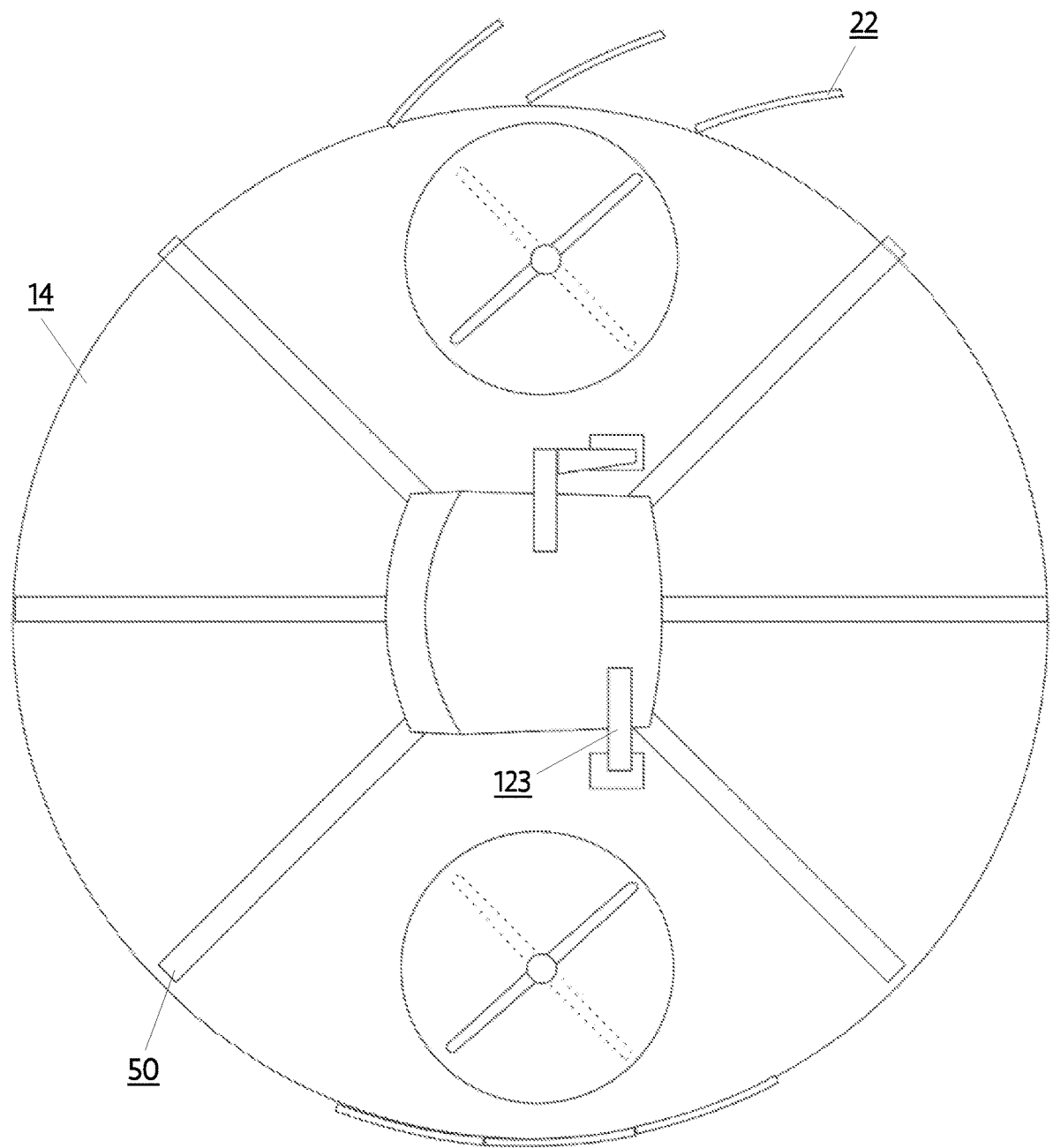
Figure 4:
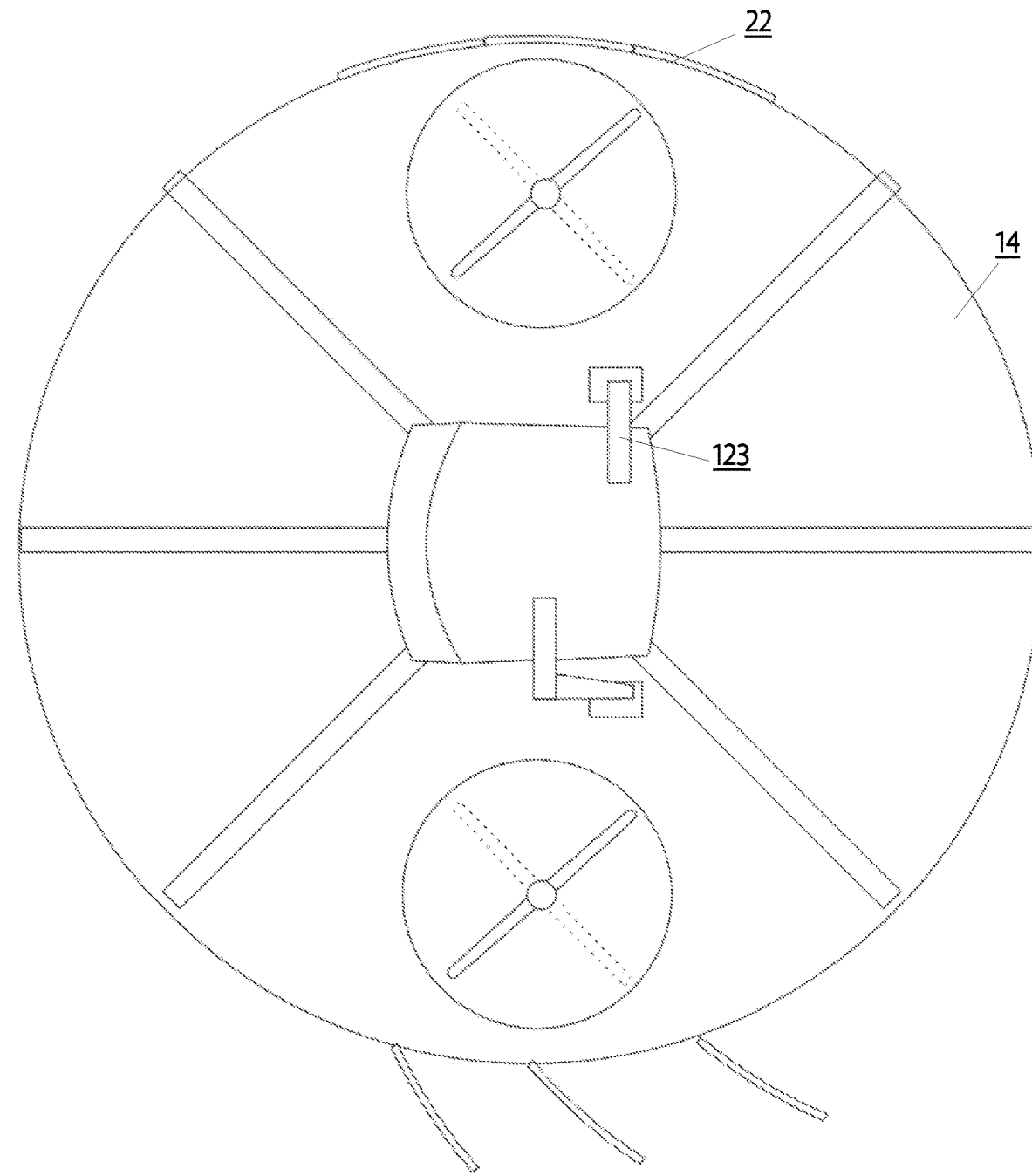
Figure 5:
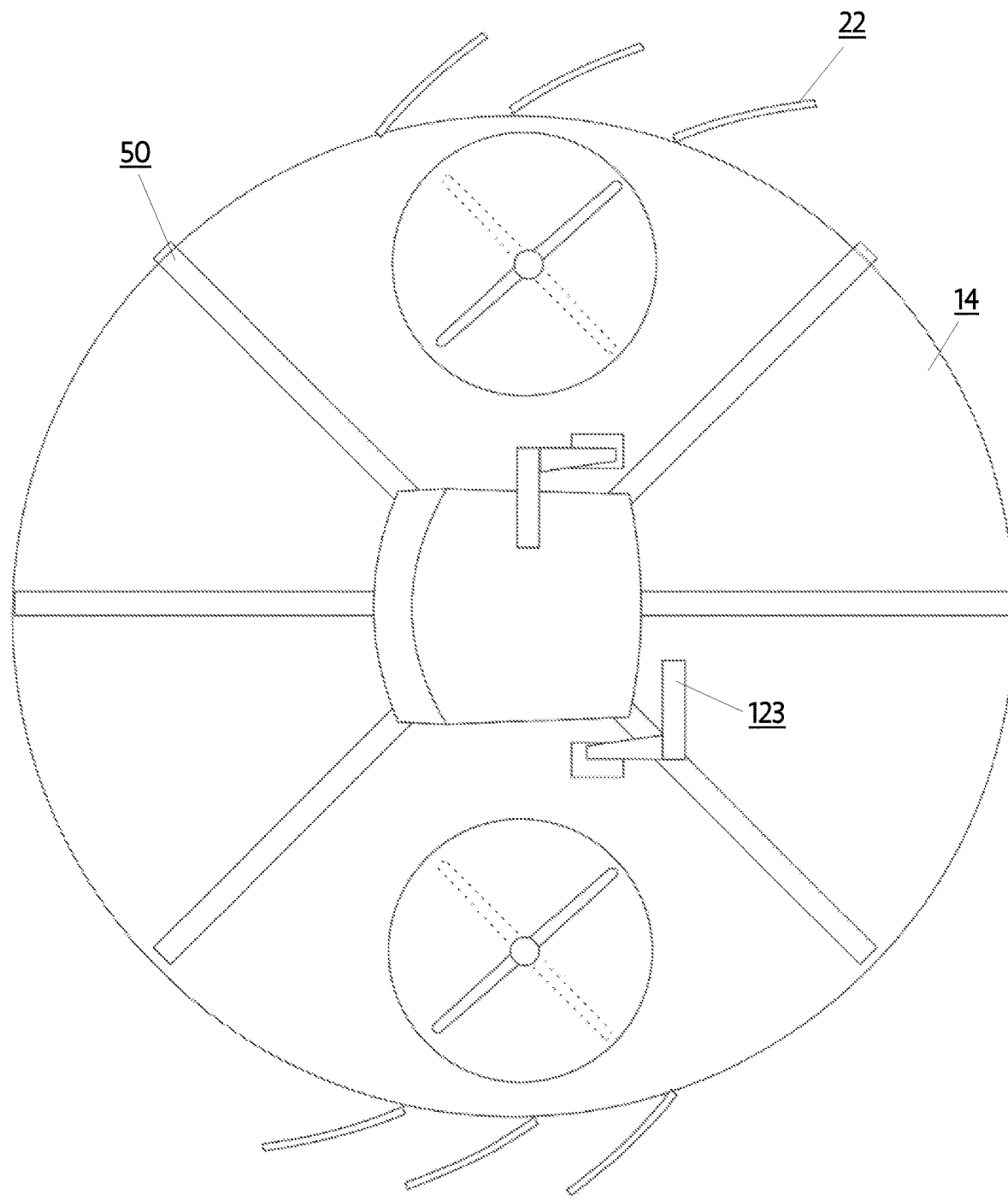
Figure 6:
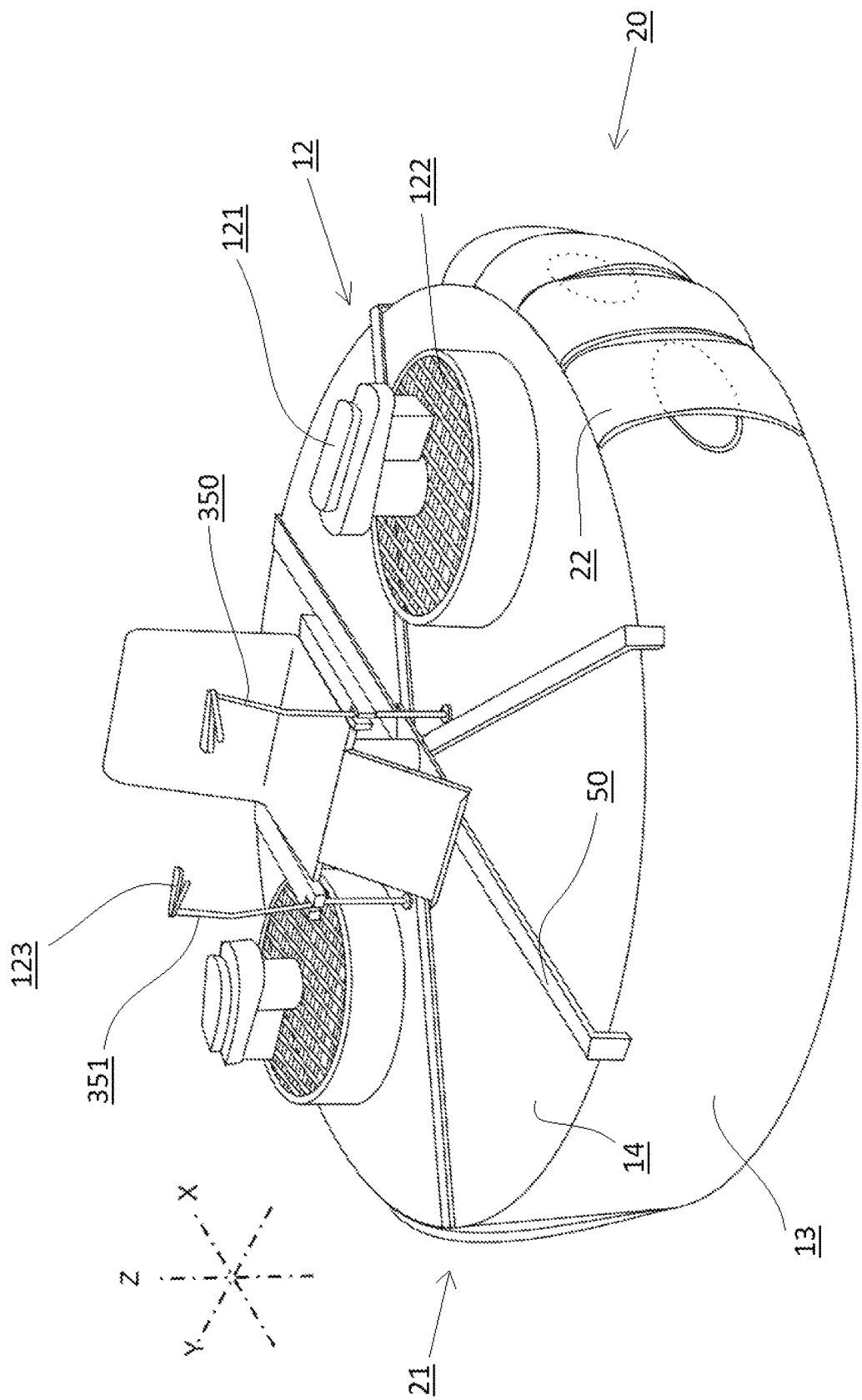
FIG. 6: Illustrates the hovercraft configuration, in flight condition.
Figure 7:
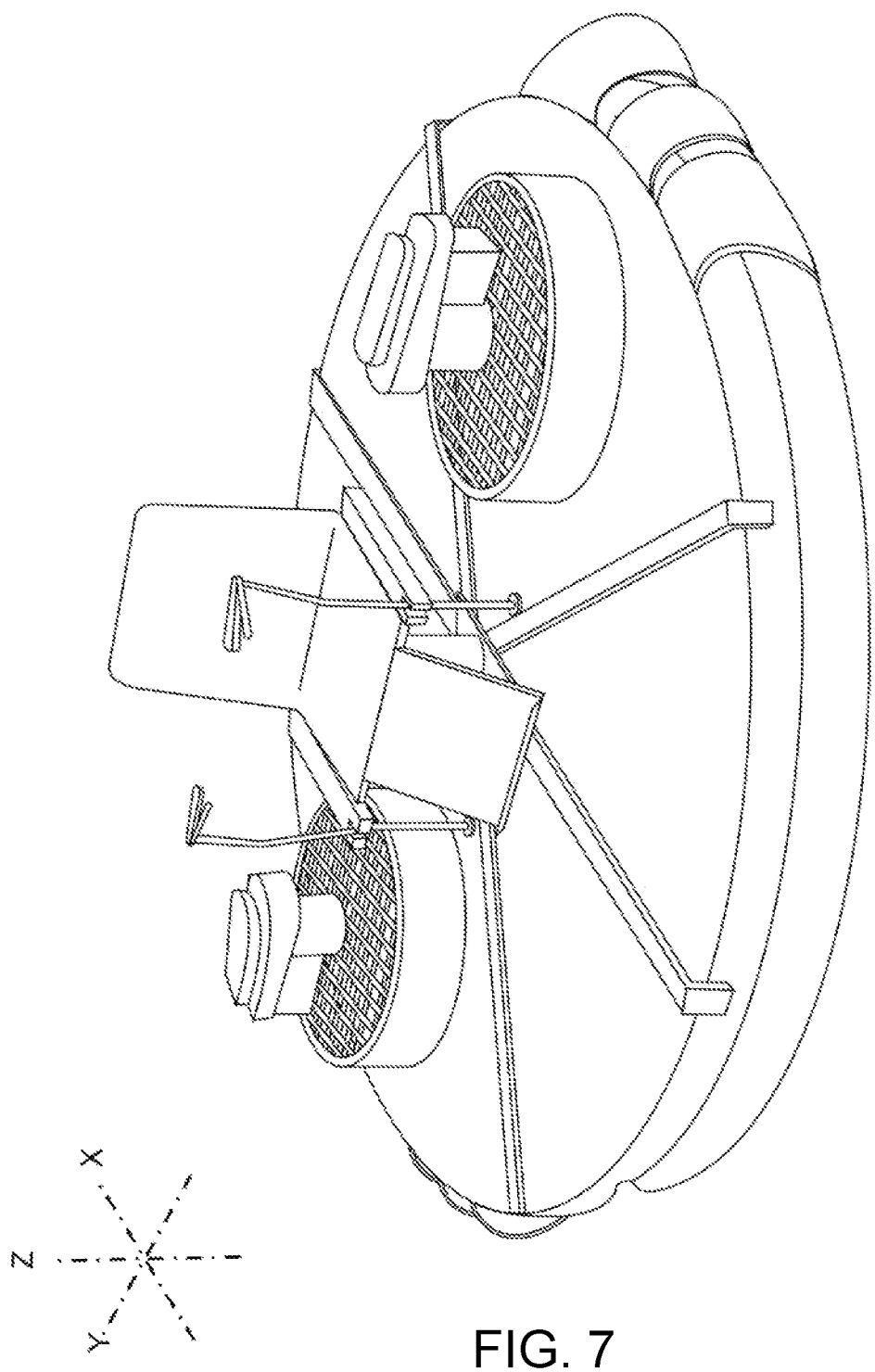
FIG. 7: Illustrates the same hovercraft depicted in FIG. 6, when the engines are turned off.

An exemplary embodiment of the present invention is the recreational hovercraft illustrated by FIG. 6. The hovercraft including imaginary longitudinal, transverse, and vertical axes; a substantially oval in shape base (50); a propulsion system (12), configured to push air against the ground; a skirt (13), the skirt (13) including two set of nozzles (20, 21) aligned on each transverse side of the skirt (13), a first set of nozzles (20) placed on the left side of the skirt (13), a second set of nozzles (21) placed on the right side of the skirt (13); each set of nozzles (20, 21) including four outflow nozzles (22). Where, alternatively, the number of outflow nozzles (22) included in each set of nozzles (20, 21) may vary, depending on the size of the hovercraft, the size of each nozzle (22), among other variables.

The propulsion system (12) of the hovercraft depicted on FIG. 6, including two engines (121), each engine (121) capable of delivering 20 HP, and coupled to a propeller (122). Each engine (121) being controlled by a lever (123) placed on each controlling sticks (350, 351). The propulsion system (12) being capable of promoting airflow downward, against the ground.

As depicted, the exemplary hovercraft of FIG. 6 further includes a so-called base (50), the base (50) consisting of a metallic structure, able to accommodate the propulsion system (12) affixed to the base (50); a chair (15) to accommodate the pilot; and the actuating means (30) aimed to receive commands applied by the pilot by using the controlling sticks (350, 351), and transfer to them to the set of nozzles (20, 21).

The metallic structure being built in aluminum, due to its mechanical properties and density. However, other suitable materials could be selected for its manufacture like aeronautic aluminum alloys or composites. Still according to the exemplary of FIG. 6, the base (50) includes hinges (not depicted), allowing the metallic structure to be folded for a more convenient storage and/or transportation.

The referred base (50) further including a substantially air impermeable cover (14) and the skirt (13). The base (50) and the cover (14) cooperating with the propulsion system (12) to create the air-cushion, known to cause the hovercraft's flight. The cover (14) and the skirt (13) being made on reinforced polyethylene film.

Figure 8:
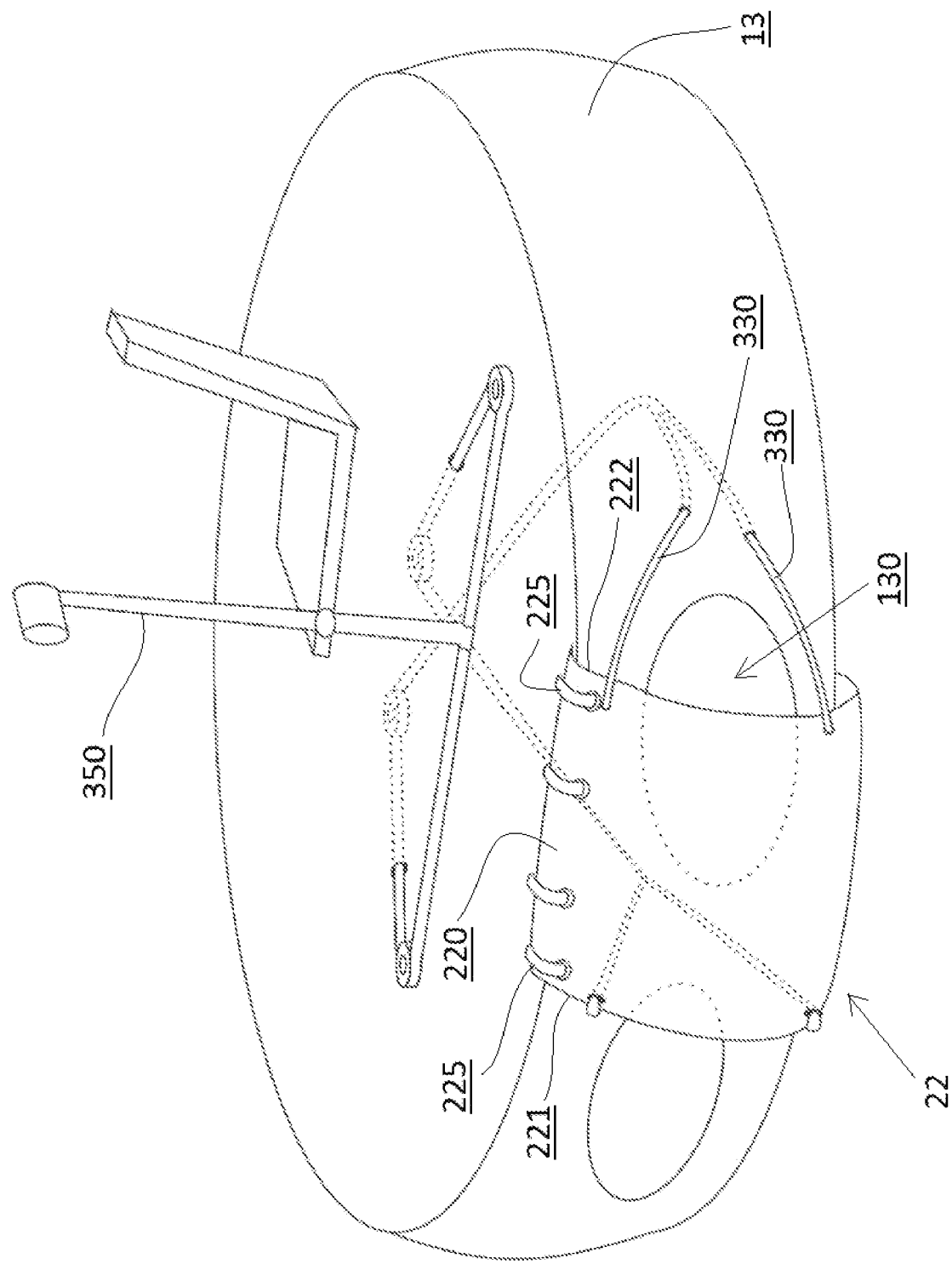
FIG. 8: Depicts a nozzle of the present invention.

According to FIG. 8, where a nozzle (22) is depicted in detail, it is possible to understand that nozzles (22) consist of a piece of air impermeable and flexible panel (220), the panel (220) being partially fixed to the skirt (13), by means of plastic "tie wraps" (225) selectively placed, and having two loose ends (221, 222), a so-called front end (221) facing towards the front of the hovercraft, and a so-called back end (222), facing towards the rear part of the hovercraft. Alternatively, and less preferable, the nozzles (22) could be built in rigid, pivotal shells.

Loose ends (220, 221) are connected to a pair of strings (330), the strings (330) are elements of the actuating means (30), as herein further on described. Once strings (330) are "pulled", they compresses the panel (220) against the skirt, causing to restrain the passage of airflow through the end (220 or 221). On the contrary, when the strings (330) are loosed they releases the panel from the skirt (13) causing to release the passage of airflow to through the end (220 or 221).

The actuating means (30), like all other component of the hovercraft are to be lightweight, since the performance of the hovercraft, particularly its ability to lift from the ground depends on compensating the weight forces of the hovercraft. In this sense, the actuating means (30) consist of a set of strings (330) and two sticks (350, 351), where a specialist in the field of hovercrafts will find different ways to arrange them. The actuating means being arranged to allow the pilot to control the opening of the ends (220 or 221) of the nozzles (22).

Accordingly to the exemplary hovercraft, the actuating means (30) were arranged to promote an independent control to the opening of the ends (220 or 221) of the set of nozzles (20, 21). Where the first and second set of nozzles (20, 21) are respectively controlled by a first and second controlling stick (350, 351). Further accordingly, each set of nozzles (20, 21) were configured to operate coordinately, i.e.; all nozzles of each set follow the same control command. The exemplary of FIG. 6, have adopted (besides non mandatory) the herein referred as "horse-logic", where the controlling sticks (350 and 351) are controlled according to FIGS. 1 to 5.

Once the stick (350 or 351) is pushed ahead, the actuating means pulls the strings of the front facing ends (221) of each nozzle of the corresponding set, and cause the closure of each front facing end (221), then, restraining airflow through the same.

Once the stick (350 or 351) is pushed back, the actuating means pull the strings of the rear facing ends (222) of each nozzle of the corresponding set, and cause the closure of each rear facing end (222), then, restraining airflow through the same.

Once the stick (350 or 351) is in neutral position, the actuating means keeps all strings relaxed and allow the opening the ends (221 and 222), then allowing the passage of airflow through the same, and keeping both ends of each nozzles in open configuration. Alternatively, in this neutral position, the control means could be arranged so that both ends (221 and 222) of the nozzles will be closed. In both cases the resulting airflow leaving from the nozzles will be equally distributed, not forcing the hovercraft to accelerate.

A control system for hovercrafts of the present invention, includes a skirt (13), the skirt (13) including air permeable regions (130) and at least two set of nozzles (20, 21); where the opening of ends (220 or 221) of the nozzles (22) are controllable by the pilot when operating the controlling means (30).

What is claimed is:

1. A hovercraft including imaginary longitudinal, transverse and vertical axes, comprising:
a propulsion system, configured to generate airflow; a base and, a skirt wherein the skirt further includes air permeable regions and at least two set of outflow nozzles; wherein the air permeable regions and a set of outflow nozzles from the at least two set of outflow nuzzles are in fluid communication, said at least one outflow nozzle including two opposing ends, a first end and a second end; the hovercraft further including actuating means for controlling an opening of at least one of said first end and said second end of said at least one outflow nozzle managing a passage of airflow through said first end and said second ends; the set of outflow nozzles further includes a piece of an air impermeable and flexible panel, said flexible panel being partially fixed to the skirt and having two loose ends, a front end facing towards a front of the hovercraft, and a back-end, facing towards a rear part of the hovercraft.

2. The hovercraft of claim 1 wherein each of said set of outflow nozzles includes 2 to 8 nozzles.

3. The hovercraft of claim 1 wherein the actuating means of further includes a set of strings and two sticks.

4. The hovercraft of claim 1 wherein the set of outflow nozzles are controlled by the actuating means under "horse logic".

5. The hovercraft of claim 1 wherein said at least two set of outflow nozzles are constructed in flexible materials.

6. A control system for a hovercraft, comprising:
a skirt, the skirt including air permeable regions and at least two set of outflow nozzles; the air permeable regions and the at least two set of outflow nozzles are in fluid communication; wherein each set of outflow nuzzles from the at least two set of outflow nuzzles include openings, the opening of ends of the at least two set of outflow nozzles are controllable by a pilot when operating a controlling means for controlling said hovercraft.

7. The control system for a hovercraft of claim 6 wherein the controlling means further includes a set of strings and two sticks.

\* \* \* \* \*